UNITED STATES PATENT OFFICE.

MERRILL B. SHERWOOD, JR., OF BUFFALO, NEW YORK, ASSIGNOR OF SEVEN-SIXTEENTHS TO FREDERICK B. HARVEY, OF SAME PLACE.

PHOSPHORESCENT COMPOSITION.

SPECIFICATION forming part of Letters Patent No. 245,411, dated August 9, 1881.

Application filed October 14, 1880. (Specimens.)

*To all whom it may concern:*

Be it known that I, MERRILL B. SHERWOOD, Jr., of Buffalo, in the county of Erie and State of New York, have invented a certain new and useful Improvement in Phosphorescent Compositions; and I do hereby declare the following to be a full, clear, and exact description of the invention, such as will enable others skilled in the art to which it pertains to make and use it.

My invention relates to an improvement in phosphorescent illuminants.

I have taken advantage of the peculiar property which obtains in many bodies of absorbing light during the day and emitting it during the night time.

The object of my invention is the preparation by a prescribed formula, to be hereinafter given, of a composition embodying one of the well-known phosphorescent substances above referred to, which will be applicable to many practical uses.

With this end in view my invention consists in a phosphorescent composition in which the chief illuminating element is monosulphide of calcium.

The composition obtained by the formula may be used either in a powdered condition by dusting it over articles previously coated, in whole or in part, with an adhesive substance, or it may be intimately mixed with paints, inks, or varnishes, serving as vehicles for its application, and in this way be applied to bodies to render them luminous.

The formula for obtaining the composition is as follows: To one hundred parts of unslaked lime, that obtained from calcined oyster-shells producing the best results, add five parts of carbonate of magnesia and five parts of ground silex. Introduce these elements into a graphite or fire-clay crucible containing forty parts of sulphur and twenty-five parts of charcoal, raise the whole mass nearly or quite to a white heat, remove from the fire, allow it to cool slowly, and, when it is cold or sufficiently lowered in temperature to be conveniently handled, remove it from the crucible and grind it. The method of reducing the composition will depend upon the mode of its use. If it is to be applied as a loose powder by the dusting process, it should be simply ground dry; but if it is to be mixed with paint or other similar substance, it should be ground with linseed or other suitable oil. In heating the elements aforesaid certain chemical combinations will have taken place and monosulphide of calcium, combined with carbonate of lime, magnesia, and silex, will be the result of such ignition.

If, in the firing of the elements, as above set forth, all of the charcoal does not unite with the other elements, such uncombined portion should be removed from the fused mass before it is ground.

If it is designed to mix the composition with paints, those composed of zinc-white and baryta should be chosen in preference to those composed of white lead and colored by vegetable matter, as chemical action will take place between the composition and paint last mentioned and its color will be destroyed or changed by the gradual action of the sulphureted hydrogen produced. However, by the addition of a weak solution of gum in alcohol or other suitable sizing to the composition, it may be used with paints containing elements sensitive to sulphureted hydrogen without danger of decomposing them and destroying their color.

In many, and possibly in a majority of, cases the illuminating composition applied as a dry powder will give the most satisfactory results, in view of the tendency to chemical action between the paint and composition when intimately mixed; in view of the fact that by the addition to paint of any color of a sufficient quantity of the composition to render the product luminous, the original color of the paint will be modified or destroyed; and, also, in view of the fact that the illuminating composition is so greatly in excess of the paint, the proportions in which they are united being substantially ten parts of the former to one of the latter, it will be difficult to impart a particular color to the product of the union without detracting from its luminosity. On the other hand, the union of dry powder with a body already painted by the simple force of adhesion does not establish a sufficiently intimate relation between it and the paint to cause chemical action, the application of a light coat of powder does not materially change the color of the article to which it is applied; and, further, by the use of the powder in an uncombined state its greatest illuminating effects are obtained. Again, if the appearance in the day-time of the article which it is desired to have appear luminous at night is not material, it may be left unpainted and simply sized to retain the powder.

In printing it is probable that the composition will be employed almost exclusively in the form of dry powder, as printing-ink, normally pasty, becomes too thick to be well handled when it is combined with powder in sufficient quantity to render the printed surface luminous. However, the printed surface of a freshly-printed sheet may be rendered luminous by dusting the sheet with powder, which will adhere to all of the inked and may be easily shaken from the unmoistened surfaces thereof.

I am aware that monosulphide of calcium and magnesia have before been used together in phosphorescent compounds.

Having fully described my invention, what I claim as new, and desire to secure by Letters Patent, is—

A phosphorescent composition consisting of monosulphide of calcium, combined with carbonate of lime, magnesia, and silex, substantially as described.

MERRILL B. SHERWOOD, JR.

Witnesses:
FRED'C. B. HARVEY,
THOS. H. GRANT.